United States Patent [19] [11] 3,905,604
Dennis [45] Sept. 16, 1975

[54] SPINDLE ADAPTOR FOR AUTOMATIC RECORD CHANGERS

[76] Inventor: James T. Dennis, 3900 SE. 29th St., Oklahoma City, Okla. 73115

[22] Filed: Oct. 29, 1973

[21] Appl. No.: 410,690

[52] U.S. Cl. .......... 274/10 S
[51] Int. Cl.[2] .......... G11B 17/12; G11B 17/14
[58] Field of Search .......... 274/10 S

[56] References Cited
UNITED STATES PATENTS

| | | | |
|---|---|---|---|
| 3,301,563 | 1/1967 | Simpson | 274/10 S |
| 3,506,274 | 4/1970 | Kelly | 274/10 S |
| 3,515,392 | 6/1970 | Kitahara | 274/10 S |
| 3,689,080 | 9/1972 | Dennis | 274/10 S |

*Primary Examiner*—Richard E. Aegerter
*Assistant Examiner*—Larry Jones
*Attorney, Agent, or Firm*—Mason, Kolehmainen, Rathburn & Wyss

[57] ABSTRACT

A spindle adaptor for 45 RPM records is in the form of a one-piece molded body, having spaced apart side walls which define a recess within which is positioned a vertically extending integrally formed flexible member which has a transversely extending head portion at the upper end thereof. The inner edge of this head portion is adapted to be engaged by the record ejector blade of the conventional record ejecting spindle when the adaptor is placed over this spindle, and the outer edge of this head portion is adapted to engage the bottom large hole record which is seated on the shelf of the adaptor. When the record ejecting blade of the spindle is moved during the record changing cycle the transversely extending head portion of the adaptor moves the bottom record off of the shelf so that it drops directly downwardly onto the turntable.

9 Claims, 20 Drawing Figures

SPINDLE ADAPTOR FOR AUTOMATIC RECORD CHANGERS

The present invention relates to automatic record changers, and more particularly, to a spindle adaptor arrangement for record changers which permits the playing of enlarged aperture records in an automatic manner.

A large number of existing phonograph records are of the type which have an enlarged centering aperture. These records are usually recorded at 45 RPM and conventional record changer arrangements employ an adaptor spindle arrangement for playing these enlarged aperture records. In most of the prior art spindle adaptor arrangements, the 45 RPM adaptor is positioned over the standard centering spindle of the record changer, and a stack of 45 RPM records may be placed on this adaptor and released to the turntable during successive record changing cycles under the control of the record ejector member of the standard centering spindle.

Various arrangements have been heretofore proposed for 45 RPM spindle adaptors which can be molded in one piece and thus can be manufactured at low cost without any hand assembly operations. One such arrangement is shown in Dennis U.S. Pat. No. 3,689,080. While these one-piece adaptor arrangements are in general suitable for their intended purpose, since they depend upon direct engagement of the ejector blade member of the small hole record centering spindle with the inner edge of the bottom record of the large hole record stack the stack of large hole 45 RPM records is necessarily offset a substantial amount from the center of the turntable. Accordingly, as the bottom large hole record is released it is required to slide a substantial distance sidewise as it falls to the turntable. This means that the record is not as lightly deposited on the turntable as it would be if it were dropped directly downwardly. Furthermore, because of the offset positioning of the stack of large hole records, the over arm or balance arm of the record changer, which maintains the record stack level while the bottom record is dropped, must be longer to extend around the offset top portion of the 45 RPM adaptor. Since the trend in record changers is toward shorter balance arms, this means that if one of these one-piece molded adaptors is employed the record changer manufacturer must either employ a longer balance arm when using the adaptor with current production or supply a longer balance arm if this adaptor is sold as a replacement part for older equipment.

While spindle adaptors have also been proposed which position the large hole record stack concentrically with the turntable and hence drop the bottom record more or less directly onto the turntable, these spindle adaptors in general involve a multiplicity of small parts which must be assembled by hand labor and hence are relatively expensive as compared with a one-piece molded adaptor. Examples of these multi-part adaptors are found, for example, in Da Costa U.S. Pat. No. 2,761,687 and Reed U.S. Pat. No. 3,191,943. While these adaptors have the advantage that they may be used with relatively short balance arms, they are nevertheless so expensive to manufacture, because of the many parts used and the assembly time required, that they are not economically suitable for today's 45 RPM adaptor market.

It is, therefore, an object of the present invention to provide a new and improved adaptor for playing large hole records which eliminates one or more of the above-mentioned disadvantages of prior art arrangements in this field.

It is a further object of the present invention to provide a new and improved adaptor for playing large hole records which is extremely simple in construction and is economical to manufacture while providing an arrangement wherein the large hole record stack is more nearly centered than previous one-piece molded adaptors.

It is another object of the present invention to provide a unitary molded adaptor which enables a conventional record changer to play large hole 45 RPM records and functions properly with a balance arm of standard length under the control of the ejector blade member of the standard small hole record centering spindle.

It is still another object of the present invention to provide a molded adaptor for 45 RPM records in which the record stack is supported at or near the center of the turntable and an intermediate ejector blade member is provided which is actuated by the ejector blade of the small hole centering spindle and is integrally formed with or firmly attached to the adaptor so as to maintain the relationship between the intermediate ejector blade and the adaptor shelf on which the large hole record stack is seated.

It is a further object of the present invention to provide a new and improved 45 RPM adaptor in which the large hole record stack is supported generally centrally of the turntable and an integral inclined shoulder is provided for easy removal of the 45 RPM records from the turntable after they have been played without requiring the provision of a movable part which is engaged and moves out of the way when the records are removed from the turntable.

It is a still further object of the invention to provide a new and improved 45 RPM adaptor in which the large hole record stack is supported generally centrally of the turntable and an inclined shoulder is provided diametrically opposite the adaptor shelf and in the path of the bottom record as it is moved off of the shelf so as to prevent records above the bottom record from being dropped with said bottom record.

Briefly, in accordance with one aspect of the invention, the spindle adaptor is in the form of a one-piece molded body, having spaced apart side walls which define a recess within which is positioned a vertically extending integral flexible member which has a transversely extending head portion at the upper end thereof. The inner edge of this head portion is adapted to be engaged by the record ejector blade of the conventional record ejecting spindle when the adaptor is placed over this spindle, and the outer edge of this head portion is adapted to engage the bottom record which is seated on the shelf of the adaptor. When the record ejecting blade of the spindle is moved during the record changing cycle the transversely extending head portion of the flexible member moves the bottom record off of the shelf so that it drops directly downwardly onto the turntable.

In accordance with another aspect of the invention, the upper surface of the transverse head portion of the flexible member is beveled to facilitate return of the flexible portion to its initial position after the bottom record has been dropped.

The invention, both as to its organization and method of operation, together with further objects and advantages thereof, will best be understood by reference to the following specification taken in connection with the accompanying drawings in which.

Figures 1, 2, 4, 5:
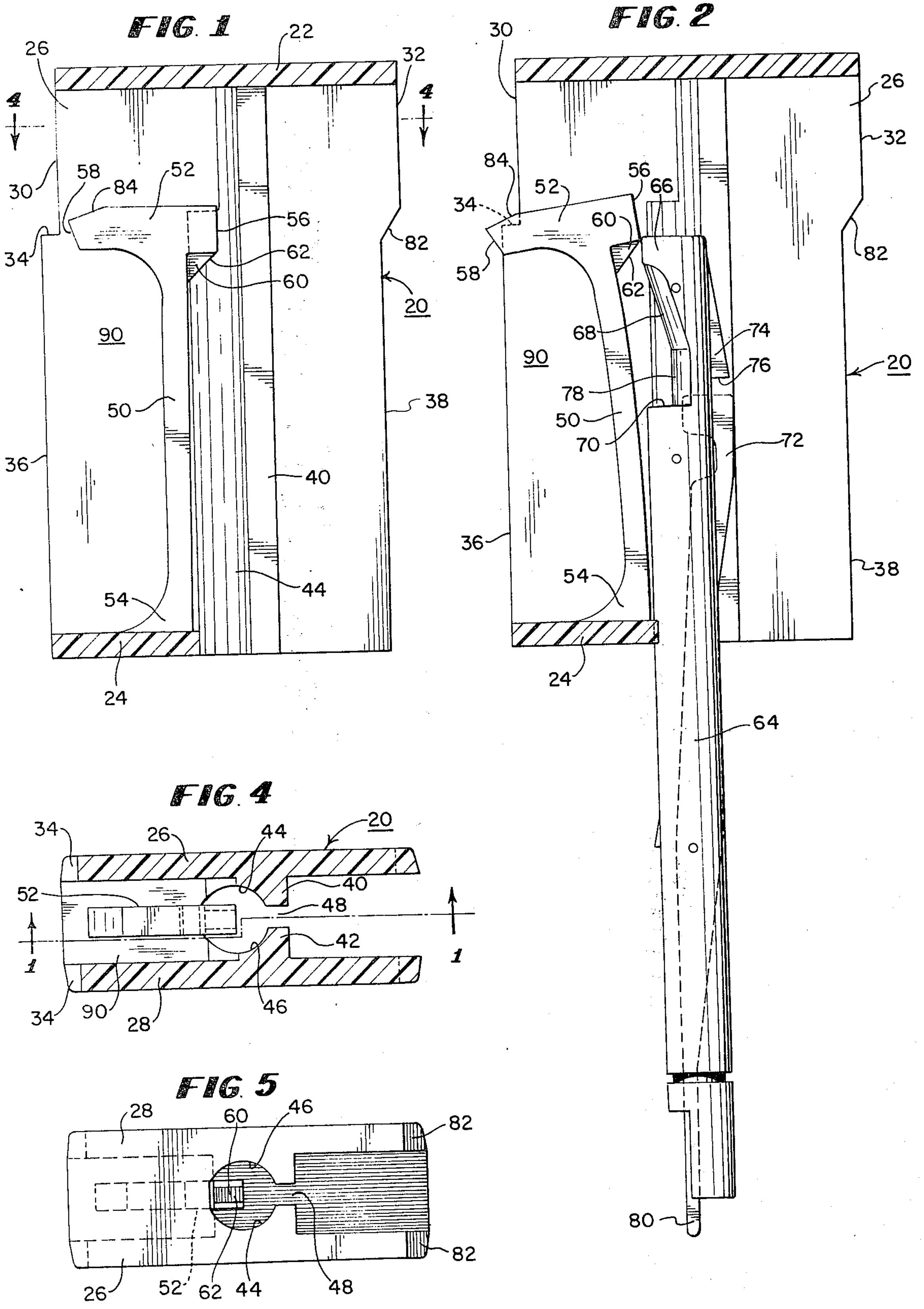
FIG. 1 is a side elevational view, partly in section, of the improved 45 RPM adaptor of the present invention.
FIG. 2 is a side elevational view of the adaptor of FIG. 1 showing the same being inserted over the centering spindle of a conventional record changer.
FIG. 4 is a sectional view taken along the lines 4—4 of FIG. 1.
FIG. 5 is a bottom view of the adaptor of FIG. 1.

Referring now to the drawings and more particularly to the embodiment of FIGS. 1 to 5, inclusive, thereof, the 45 RPM spindle adaptor of the present invention is therein illustrated generally at 20 and is in the form of a one-piece molded adaptor body having top and bottom walls 22 and 24 and vertically extending spaced apart side walls 26 and 28, the front and rear edges 30 and 32 of the top portions of the side walls 26 and 28 act as a record receiving section for a stack of large hole records, the forward edges 30 terminating in a pair of spaced apart ledges 34 which act as a record supporting shelf on the adaptor 20 for a stack of large hole records. The forward and rear edges 36 and 38 of the lower portions of the side walls 26 and 28 form a record centering section, the forward edges 36 of this section extending vertically and terminating at their upper edges at the record supporting ledges 34.

The adaptor 20 is arranged to support a stack of large hole records substantially concentrically with the record ejecting spindle of a conventional record changer. To this end, the adaptor 20 is provided with means defining a centrally positioned bore which is adapted to receive the small hole record centering spindle of a conventional record changer. More particularly, the side walls 26 and 28 are provided with vertically extending inwardly facing ridge portions 40 and 42 (FIG. 4) each of which has an arcuate contour 44, 46, so as to define a circular bore which can receive the small hole record centering spindle and locate it properly with respect to the adaptor 20. The ridges 40, 42 also define a vertically extending slot 48 through which the record ejector blade portion of the small hole record ejecting spindle may pass as the adaptor is inserted onto said spindle, as will be described in more detail hereinafter.

In accordance with an important feature of the present invention, the adaptor 20 is provided with an integral, elongated vertically extending portion 50 which carries a transversely extending head portion 52 at the upper free end thereof. In the embodiment of FIGS. 1 to 5, inclusive, the base portion 54 of this elongated member 50 is integral with the bottom wall 24 of the adaptor 20. However, the sides of the member 50 are spaced from the side walls 26, 28 of the adaptor so that the transverse head portion 52 thereof is free to move by virtue of the flexibility of the elongated intermediate portion 50. The inner edge 56 of the head portion 52 is adapted to be engaged by the record ejector blade of the conventional centering spindle and the outer edge 58 thereof is arranged to engage the inner edge of the bottom large hole record which is seated on the adaptor shelf 34 and moves this record off of the shelf during the record changing cycle. The head portion 52 is of sufficient height that the forward edge 58 thereof positively engages the inner edge of the bottom record but does not engage the inner edge of the next record above the bottom record during the record changing cycle.

A web portion 60, which is thinner than the adjacent portions of the elongated member 50 and head portion 52, is provided to define an inclined camming shoulder 62 which extends between the upper end of the portion 50 and the back edge 56. The camming shoulder 62 is provided for the purpose of facilitating flexure of the member 50 as the adaptor is inserted over the conventional small hole record centering spindle. Thus, as shown in FIG. 2, when the adaptor 20 is inserted over the upper end of a conventional small hole record centering spindle 64, the upper end 66 of the spindle 64 strikes the camming shoulder 62 and flexes the head portion 52 outwardly to the position shown in FIG. 2 as the adaptor 20 is inserted on the spindle 64.

In the embodiment of FIGS. 1 to 5, inclusive, the centering spindle 64 of the type having an undercut portion 68 which defines a record supporting shelf 70 on which a stack of small hole records may be seated. A record ejector blade 72 is pivotally mounted within the body of the spindle 64 and is arranged to engage the inner edge of the bottommost record of the stack of small hole records seated on the shelf 70 and move this bottom record off of the shelf during the record changing cycle. A transversely immovable vertically slidable member 74 is also provided in the spindle 64 to define a shoulder the undercut edge 76 of which is spaced just slightly more than the thickness of a small hole record above the shelf 70 so that the bottommost record of the stack may pass beneath the edge 76 and be ejected while records above the bottom record are restrained by the member 74. It will be noted that the slot 48 provided in the adaptor 20 accommodates both the member 74 and the ejector blade 72 as the adaptor 20 is inserted over the spindle 64. The upper portion of the slot 48 is preferably of the same width as the member 74 to prevent turning of the adaptor 20 on the spindle 64, while the portion of the slot 48 below the member 74 is preferably wider than the blade 72 to prevent this blade from jamming as it is activated.

Figures 3, 6, 7:
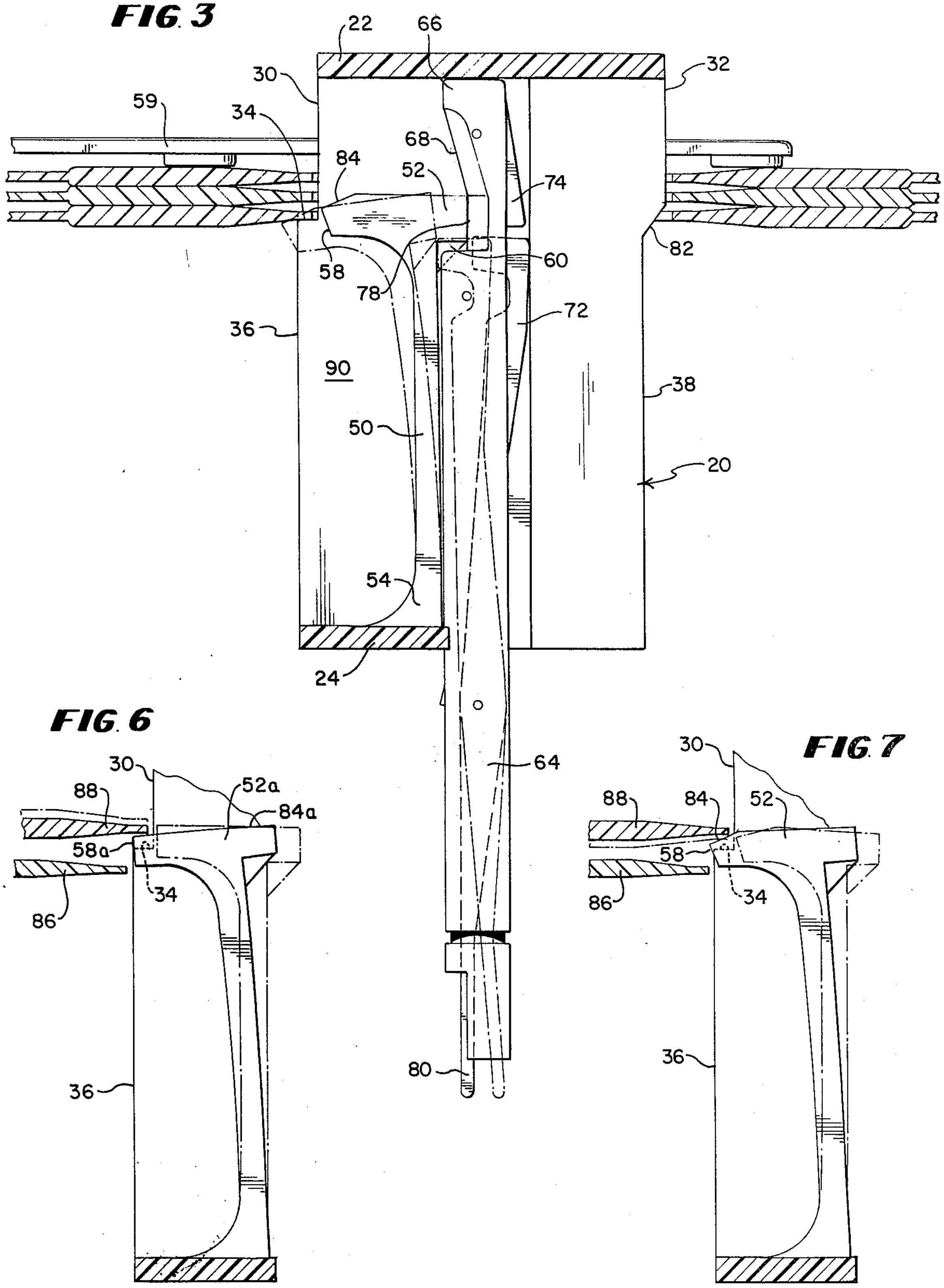
FIG. 3 is a sectional side elevational view similar to FIG. 2 but showing the adaptor in operative playing position on the small hole record centering spindle.
FIGS. 6 and 7 are side elevational views illustrating the preferred construction of the adaptor of FIG. 1 in ejecting the bottommost record in a large hole record stack.

When the adaptor 20 has been moved to its operative position on the spindle 64 it assumes the position shown in FIG. 3 wherein the upper end 66 of the spindle 64 engages the top wall 22 of the adaptor 20 and the web 60 is positioned in a slot in the small spindle shelf 70 which is normally provided to permit overtravel of the ejector blade 72. In this position the movable transverse head portion 52 is positioned so that the rear edge 56 thereof engages a vertically extending portion 78 of the undercut portion 68 of the spindle 64 and in this position the outer edge 58 of the head portion 52 is positioned approximately in line with the vertically extending edges 30 of the side walls 26, 28 and at a level so that the edge 58 will strike the inner edge of the bottom record seated on the shelf 34 when the back edge 56 of the head portion 52 is engaged by the ejector blade 72 of the spindle 64 during the record changing cycle. Preferably, the elongated portion 50 of the adaptor 20 is slightly flexed when the edge 56 is in engagement with the edge 78 of the spindle 64 so that a slight biasing force is exerted on the head portion holding the edges 56, 78 against one another and positioning the outer edge 58 of the head portion 52 properly so that records may be inserted over the upper end of the adaptor 20 and seated on the shelf 34 without interference from the head portion 52. Also, this biasing force is sufficient to maintain the adaptor 20 in its operative position on the spindle 64 but is not sufficiently great to interfere with removal of the adaptor 20 after the records have been played, it being in some instances more convenient to remove the adaptor first and then remove the stack of large hole records from the turntable. If greater force is desired to hold the adaptor 20 on the spindle 64, the upper part of the bore 44, 46 may be made to frictionally grip the upper end of the sides of the spindle 64, in the event it is desired to remove records over the adaptor and the force exerted by the head portion 52 is not great enough.

During the record changing cycle, the bottom end 80 of the record ejector blade 72 of the spindle 64 is moved to the position shown in dotted lines in FIG. 3 and as a result the upper end of the blade 72 engages the rear edge 56 of the head portion 52 and moves this head portion to the position shown in dotted lines in FIG. 3 while at the same time the intermediate elongated portion 50 flexes in the manner shown in FIG. 3 to accommodate such movement of the transverse head portion 52. It will be noted that movement of the head portion 52 is sufficient to move the forward edge 58 thereof outwardly beyond the edge of the adaptor shelf 34 so that the bottom large hole record of the stack seated on the shelf 34 is moved off of this shelf and drops directly downwardly onto the turntable of the record changer. As this occurs, the remaining stack of large hole records is maintained horizontal by a conventional balance arm 59 shown in FIG. 3, as will be readily understood by those skilled in the art. It will be also understood that the stack of records may be maintained horizontal by means of a suitable edge support, insofar as the present invention is concerned.

After individual records of the large hole record stack have been successively deposited on the turntable during successive record changing cycles, the balance arm 59 is removed and the record stack may be lifted upwardly and since the upper record receiving portion 30, 32 of the adaptor is offset only very slightly from the bottom centering portion 36, 38, this stack of records may be readily removed. Furthermore, in accordance with a further feature of the invention, the side walls 26, 28 of the adaptor 20 are provided with inclined portions 82 which interconnect the upper and lower rear edges 32, 38 of each side wall and collectively provide an interference shoulder which is inclined inwardly and downwardly toward the centering spindle 64 in the path of the bottommost record seated on the shelf 34. The inclined shoulder 82 facilitates the removal of the stack of records after they have been played since the records slide smoothly over this inclined surface as they are lifted off of the adaptor 20.

The interference shoulder 82 also functions to prevent double dropping of records during the same record changing cycle, as described in detail in the above-identified Dennis U.S. Pat. No. 3,689,080. Thus, while reference may be had to said patent for a detailed description of the action of the interference shoulder 82, it may briefly be stated that the inclined edges 82 form an interference shoulder in the path of the bottom record which must be overcome by the force supplied by the record ejector member 72 as it moves the bottom record to the edge of the adaptor shelf 34. Accordingly, as the bottom record is moved to the edge of the shelf 34, it is cammed downwardly along the inclined surfaces 82 by the force exerted by the ejector blade 72. Since the next record above the bottom record is not positively driven by the record ejector blade there is no driving force available by means of which this second record can also be moved downwardly along the shoulder 82 so that double dropping of records during the same record changing cycle is positively prevented.

While the inclined shoulder 82 is advantageous in facilitating removal of the record stack as described above, it will be understood that an undercut shoulder, such as the one provided by the member 74 for small hole records may alternatively be employed in place of the inclined shoulder 82 on the rear edge of the adaptor 20. However, such an abrupt shoulder does not facilitate the removal of the large hole record stack once the records have been played, as described heretofore.

In accordance with a further feature of the present invention, the top surface of the head portion 52 is provided with an inclined or beveled portion 84 adjacent the forward edge 58 thereof. The beveled surface 84 is provided in the area of the head portion 52 on which the next record in the stack will rest as the bottom record is dropped during the record changing cycle. This next record and the weight of the records above it will press downwardly on the top surface of the head portion 52 in the area of the bevel 84 and could interfere with the return of the head portion 52 to its normal position shown in FIG. 3 since the return of the head portion 52 to this normal position is accomplished solely by the biasing force built up in the elongated portion 50 as it is flexed outwardly by engagement with the record ejector blade 72.

The beveled portion 84 is given a sufficient incline that the stack of large hole records remaining after the bottom record is dropped is not lifted upwardly as the head portion 52 is returned to its rest position shown in FIG. 3. If the top surface of the head portion 52 is made flat, the remaining record stack would have to be lifted slightly in order to permit the head portion 52 to be returned to its rest position. These two conditions are shown in FIGS. 6 and 7 somewhat diagrammatically. Thus, in FIG. 6, a head portion 52*a* having a flat top surface 84*a* is shown in its outermost flexed position at the point at which the bottom record 86 has just been moved off of the shelf 34 by engagement of the forward edge 58*a* of the head portion 52*a* therewith. The next record above the bottom record, i.e., the record 88 rests on the top surface 84*a* and it will be evident from FIG. 6 that as the head portion 52*a* is returned to its rest position shown in dotted lines in this figure, the next record 88 and the records above it will have to be lifted slightly to the position shown in dotted lines in FIG. 6 by virtue of the flat top surface 84*a* on the head portion 52*a*.

On the other hand, as shown in FIG. 7, the bevel 84 provided on the head portion 52 in the area where the next record 88 will strike it as the bottom record 86 is released off the shelf 34, facilitates the return of the head portion 52 to its rest position shown in dotted lines in FIG. 7 because the record stack including the next to the last record 88 is not at any time lifted upwardly as the head portion 52 is returned to its rest position. In fact, as shown in FIG. 7, the remaining record stack including the record 88 drops slightly to the position shown in dotted lines in FIG. 7 as the head portion 52 returns to its rest position. Of course, in both FIGS. 6 and 7 the record stack including the record 88 drops downwardly onto the shelf 34 as soon as the forward edge 58 or 58*a* moves inwardly beyond the inner edge of the record 88, so that this edge may engage the record 88 which has now become the bottom record and eject it during the next record changing cycle.

The adaptor 20 is particularly suited for a onepiece molding operation so that the adaptor may be made very economically on a mass production basis. Thus, by employing the flat side walls 26, 28 a side opening recess 90 is provided which extends vertically along the length of the adaptor 20 and within which the elongated flexible portion 50 and head portion 52 are positioned. Accordingly, a die member may be inserted from the side into the recess 90 of the proper shape to form the elongated portion 50 and head portion 52 while at the same time the vertical bore 44, 46 and slot 48 and formed by appropriate die members inserted from the bottom and rear side of the adaptor respectively. Accordingly, the entire adaptor 20 including the movable head portion 52 and elongated flexible portion 50 may be formed in a single molding operation with all of the attendant advantages discussed heretofore.

Figure 8:
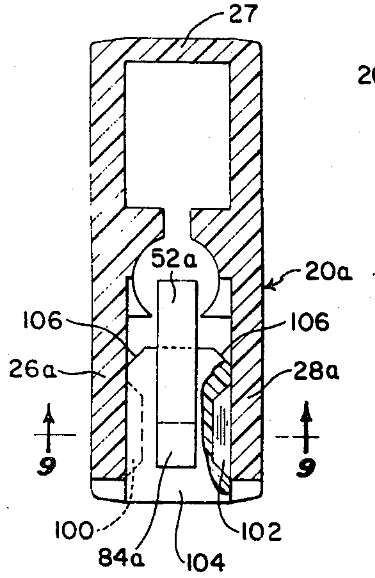
FIG. 8 is a sectional fragmentary sectional top view of an alternative construction for the adaptor of FIG. 1.
Figure 9:
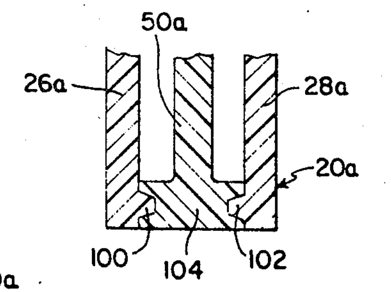
FIG. 9 is a sectional view taken along the lines 9—9 of FIG. 8.
Figure 10:
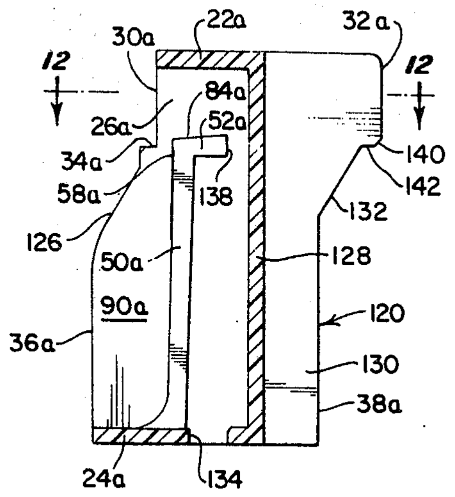
FIG. 10 is a sectional side elevational view of an adaptor which forms a further alternative embodiment of the invention.

The elongated portion 50 and head portion 52 may also be formed as a part of a separate base member which may be snapped into place to provide an integral one-piece adaptor as described heretofore. Such a two-piece molded arrangement is shown in FIGS. 8 and 9 wherein the side walls 26*a* and 28*a* of the adaptor 20*a* are provided with inwardly projecting horizontally extending wedge shaped projections 100 and 102. In the adaptor 20*a* of FIGS. 8 and 9 a separately molded base portion 104 is provided in place of the integral bottom wall 24 of the adaptor 20 and has integrally formed therewith the elongated upstanding flexible portion 50*a* which carries at the free upper end thereof a head portion 52*a* similar to the head portion 52 described in detail heretofore in connection with the adaptor 20. The base portion 104 is provided with horizontally extending grooves along the edges thereof which match the projections 100 and 102 on the side walls 26*a* and 28*a* so that the base portion 104 may be snapped into place between the side walls 26 *a* and 28*a* and be firmly held in position so that the base of the elongated portion 50*a* is rigidly connected to the adaptor 20*a*. Furthermore, the inner corners 106 of the base portion 104 may be mitered so as to facilitate insertion of the base 104 between the side walls 26*a* and 28*a* when the member 104 is snapped into place. Also, the side walls 26*a* and 28*a* are connected by a rear wall 27 which extends vertically, following the contours of the edges 38, 82 and 32 of the adaptor 20, so that the forward edges of the walls 26*a* and 28*a* will securely grip the member 104.

Once the base portion 104 has been inserted into the adaptor 20*a* the adaptor functions in exactly the same manner as described in detail heretofore in connection with the adaptor of FIGS. 1 to 5, inclusive. However, in the embodiment of FIGS. 6 and 7, only the base portion 104 and portions 50 and 52*a* need be formed of material which will withstand repeated flexing without breaking, which material may be slightly more expensive, and the other portion of the adaptor may be made of relatively inexpensive material since it involves no flexure element. In the embodiment of FIGS. 1 to 5, inclusive, the entire adaptor must be made of material which will withstand repeated flexing to insure a long lasting adaptor.

In FIGS. 10 to 13, inclusive, of the drawings, there is shown an alternative embodiment of the invention, wherein the adaptor 20 is provided for adapting the small hole record centering spindle 122 to play large hole 45 RPM records. Referring to these figures, the adaptor 120 is arranged to cooperate with a centering spindle 122 which has an offset top portion 124 and a record supporting shelf 70*a*, a vertically slidable but horizontally immovable member 74*a* for restraining all but the bottom record, and a record ejector blade 72*a* which is pivotally mounted in the body of the spindle 122 and is moved from the position shown in full lines in FIG. 11 to the position shown in dotted lines therein during the record changing cycle.

The adaptor 120 is provided with an upper record receiving portion which is somewhat offset from the bottom record centering portion of the adaptor so as to position the spindle 122 closer to the shelf provided on the adaptor 120 for supporting large hole records. More particularly, the side walls 26*a* and 28*a* of the adaptor 120 define the vertically extending forward record receiving edges 30*a*, the horizontal adaptor shelf portion 34*a*, the bottom vertically extending forward edges 36*a* which center the record after it has been dropped, and the inclined edges 126 which interconnect the shelf portion 34*a* and the centering edges 36*a*.

The side walls 26a and 28a are connected by means of a vertically extending rear wall 128 and a single thin portion 130 extends rearwardly of the rear wall 128 to provide the cooperative vertical portions 32a and 38a, and the interconnecting inclined portion 132. The bottom wall 24a of the adaptor 120 is provided with an opening 134 adapted to receive the spindle 122 and a slot 136 is provided therein to permit the outwardly projecting record ejector blade portion 72a of the spindle 122 to pass as the adaptor 120 is inserted on this spindle. The rear wall 128 together with the side walls 26a and 28a thus forms a vertically extending bore which is adapted to receive the spindle 122, the upper end 124 of the spindle 122 being engaged with the top wall 22a of the adaptor 120 when this adaptor is in operative position on the spindle. The side wall 26a and 28a also define a side opening recess 90a within which is positioned an elongated upstanding flexible member 50a and carries a transversely extending head portion 52a on the upper end thereof. The head portion 52a is movable by engagement with the ejector blade 72a during the record changing cycle as the elongated portion 50a flexes, in the manner described heretofore in connection with the embodiment of FIGS. 1 to 5, inclusive.

It will be noted that in the embodiment of FIGS. 10 to 13, inclusive, the forward edge 58a of the head portion 52a is positioned in line with the elongated portion 50a whereas in the embodiment of FIGS. 1 to 5, inclusive, the forward edge 58 is offset by a substantial amount from the elongated portion 50. This means that in the embodiment of FIGS. 10 to 13, inclusive, the forward edge 58a does not move downwardly as much as the edge 58 in the embodiment of FIGS. 1 to 5 because the pivotal axis for the elongated member 50a is closer to the edge 58a. Accordingly, the edge 58a moves in a somewhat more horizontal plane than the edge 58 in the embodiment of FIGS. 1 to 5, inclusive.

Figures 11, 12, 13, 14:
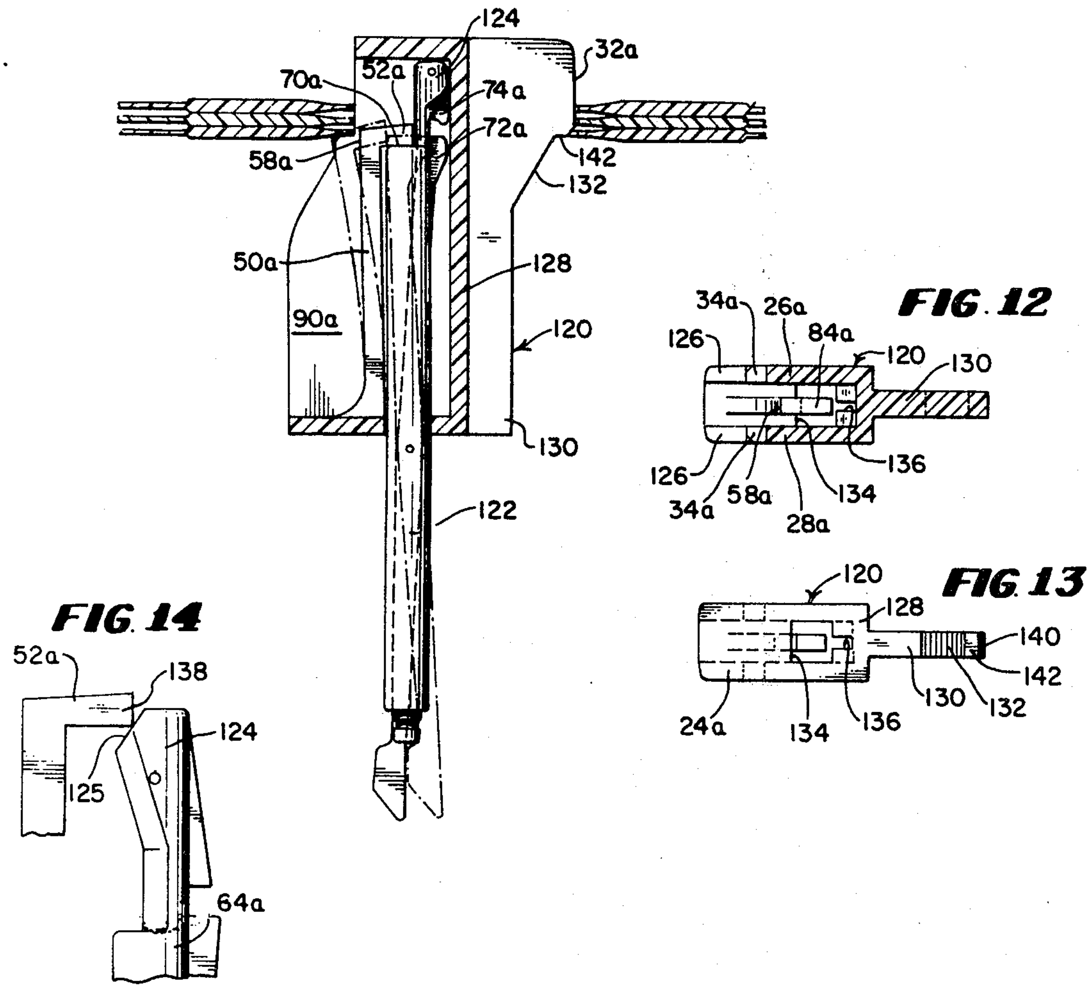
FIG. 11 is a side elevational view showing the adaptor of FIG. 10 in operative position on a small hole record centering spindle.
FIG. 12 is a sectional view taken along the lines 12—12 of FIG. 10.
FIG. 13 is a bottom view of the adaptor of FIG. 10.
FIG. 14 is a fragmentary side elevational view showing an alternative spindle arrangement for use with a modified adaptor of the type shown in FIG. 10.

The head portion 52a is also provided with a beveled or inclined top surface 84a which facilitates the return of the head portion 52a to its rest position shown in FIG. 11 as described in detail heretofore in connection with FIGS. 6 and 7. It will also be noted that in the unflexed position of the elongated member 50a shown in FIG. 10 the edge portion 58a is spaced somewhat away from the vertical edge 30a which aligns the inner edges of the large hole records supported on the shelf 34a. However, when the adaptor 120 is inserted on the spindle 122 the upper portion 124 thereof engages the bottom corner 138 of the head portion 52a and flexes the member 50a so that the head portion 52a occupies the position shown in FIG. 11. In this position the forward edge 58a is positioned closely adjacent the inner edge of the bottom record positioned on the shelf 34a. Also, the slight flexing of the portion 50a thus provided when the adaptor 120 is inserted on the spindle 122 insures that the head portion 52a returns to its rest position shown in FIG. 11 after each record changing cycle. Furthermore, this flexure bias is exerted against the spindle portion 124 so as to hold the adaptor 120 on the spindle 122 with a slight force.

In the embodiment of FIGS. 10 to 13, inclusive, a small inclined interference shoulder portion 140 is provided at the level of the bottom record of the large hole record stack, this shoulder cooperating with an undercut portion 142 to insure that only the bottom record of the large hole record stack is moved off of the shelf 34a during a single record changing cycle. In this connection it will be understood that the inclined edge 132 may be made to extend upwardly to intersect the vertical edge 32a if desired, so as to provide a somewhat longer inclined interference shoulder which will facilitate removal of the large hole records after they have been deposited on the turntable.

It will be noted that the upper end portion 124 of the spindle 122 is rounded so as to facilitate insertion of the adaptor 120 over this spindle. However, if desired, the upper end portion 124 of the small centering spindle can be provided with a mitered top portion 125 which is adapted to engage the bottom corner 138 of the head portion 52a in the manner shown in FIG. 14 and provides a camming action to facilitate insertion of the adaptor 120 over the spindle 64a. In FIG. 14 the small spindle 64a is similar to the spindle 64 described heretofore in connection with FIGS. 1 to 5, inclusive, and the bore of the adaptor 120 must be changed to accommodate this type of spindle.

Figure 15:
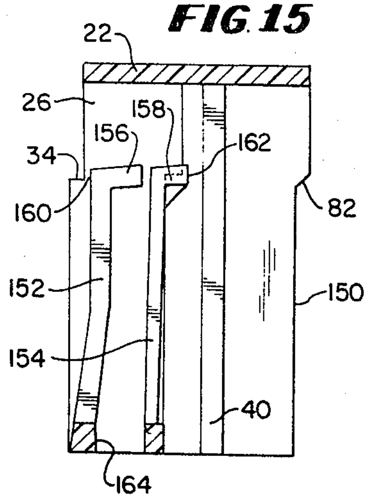
FIG. 15 is a side elevational view of an adaptor which forms a still further alternative embodiment of the present invention.
Figure 17:
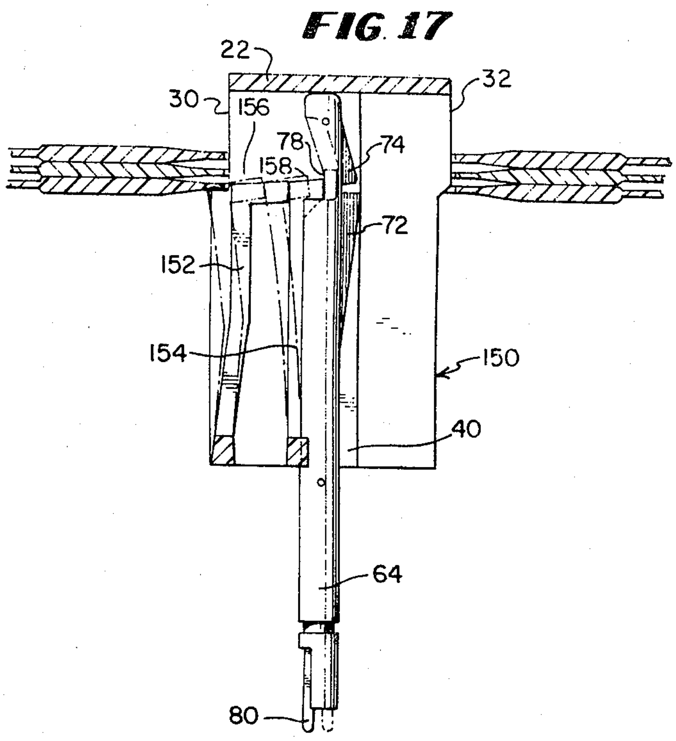
FIG. 17 is a side elevational view of the adaptor of FIG. 15 shown in operative position on a small hole record centering spindle.
Figure 16:
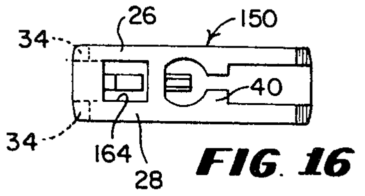
FIG. 16 is a bottom view of the adaptor of FIG. 15.

In FIGS. 15, 16 and 17, an alternative embodiment of the present invention is shown wherein the advantages of the arrangement of FIGS. 1 to 5, inclusive, are combined with those of the embodiment of FIGS. 10 to 13, inclusive. More particularly, in the embodiment of FIG. 15, an adaptor 150 is provided which has an outer configuration generally similar to the embodiment of FIGS. 1 to 5, inclusive, and corresponding elements have been given the same reference numerals in FIG. 15. However, in the embodiment of FIG. 15 two separately movable elongated vertically extending members 152 and 154 are provided, each of these members being provided with a transversely extending head portion at the upper free end thereof. Thus, the head portion 156 is provided on the upper end of the elongated portion 152 and the head portion 158 is provided on the upper end of the elongated portion 154.

In the unstressed and unflexed position shown in FIG. 15 the head portions 156 and 158 are not touching. However, when the spindle 64 is inserted into the bore of the adaptor 150 both the elongated portion 154 and the elongated portion 152 are flexed slightly so that the head portions 156 and 158 are touching. Furthermore, the outer edge portion 160 of the head portion 156 is then positioned closely adjacent the vertically extending forward edge 30 of the record receiving portion of the adaptor 150 (as shown in FIG. 16) and the rear edge 162 of the head portion 158 is flexibly biased into engagement with the vertically extending portion 78 of the spindle 64.

During a record changing cycle, the record ejector blade 72 engages the rear edge 162 and flexes both members 152 and 154 outwardly to the position shown in dotted lines in FIG. 17 in which position the forward edge 160 of the head portion 156 has been moved outwardly beyond the shelf 34 and in so doing moves the bottom record off of this shelf so that it is dropped vertically onto the turntable below.

It will be noted that the forward edge 160 in the embodiment of FIGS. 15 to 17, inclusive, moves in a generally horizontal plane since the elongated member 152 has a pivotal axis directly beneath the adaptor shelf 34. Accordingly, the advantages discussed above in connection with the offset arrangement shown in FIGS. 10 to 13, inclusive, are secured in the embodiment of FIG. 15 while at the same time providing an adaptor wherein the records are dropped vertically off of the adaptor shelf onto the turntable. In this connection it will be understood that the adaptor 150 is also arranged to be manufactured in a one-piece molding operation since both the elongated members 152 and 154 may be formed by a suitable die inserted through the side opening recess formed between the side walls 26, 28 of the adaptor and a suitable die member may be inserted in the opening 164 provided in the bottom wall of the adaptor at the same time that the bore for the spindle 64 is formed.

Figure 18:
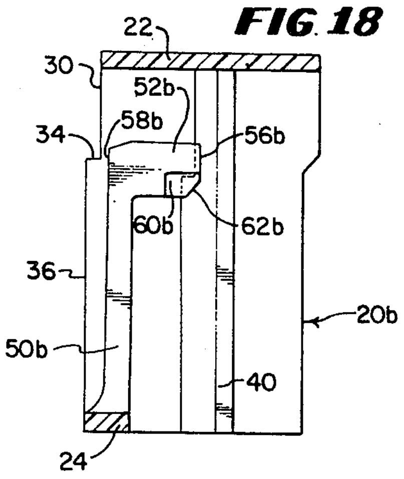
FIG. 18 is a side elevational view of an adaptor forming another alternative embodiment of the invention.
Figure 20:
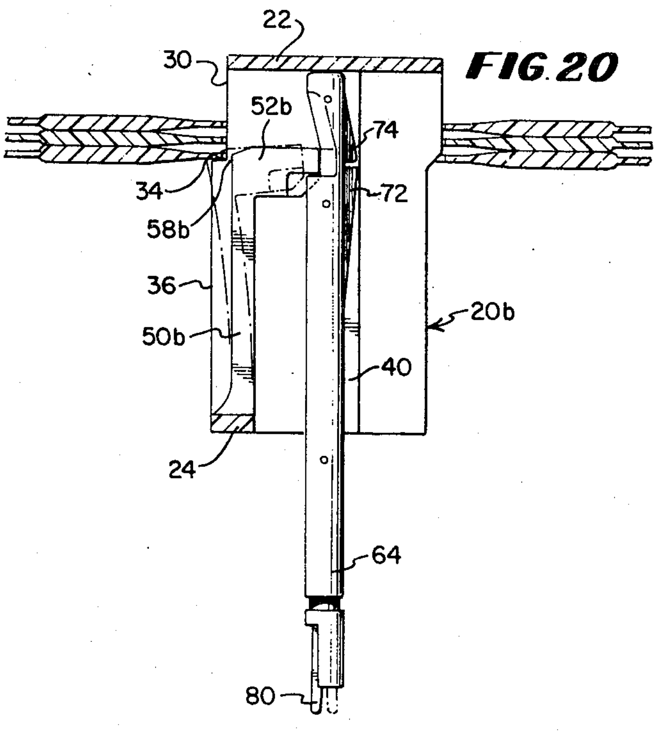
FIG. 20 is a side elevational view of the adaptor of FIG. 18 shown in operative position on a small hole record centering spindle.
Figure 19:
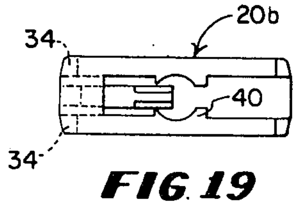
FIG. 19 is a bottom view of the adaptor of FIG. 18.

In FIGS. 18, 19 and 20 a further embodiment of the invention is shown which is similar to the embodiment of FIGS. 1 to 5, inclusive. However, in the embodiment of FIGS. 18 to 20, the vertically extending elongated member **50*b* of the adaptor 20*b* has its pivotal axis positioned in vertical alignment with the forward edge 58*b* of the head portion 52*b*. With this arrangement, the forward edge portion 58*b* moves in a generally horizontal plane as the member 50*b* flexes. However, the rear edge 56*b* of the head portion 52*b* moves a substantial amount vertically due to the offset positioning of the head 52*b* with respect to the elongated portion 50*b*. Accordingly, the head portion 52*b* is made to have somewhat more height and the rear edge 56*b* extends into the web portion 60*b* which is adapted to fit into the slot formed in the shelf 70 of the centering spindle 64. The web portion 60*b* is however provided with a mitered portion 62*b* which facilitates flexure of the portion 50*b* as the adaptor 20*b* is inserted on the spindle 64. The embodiment of FIGS. 18 to 20 thus provides an arrangement wherein the large hole record stack may be dropped directly onto the turntable and also insures that the forward edge 58*b* which engages the inner edge of the bottom record, moves in a substantially horizontal plane so as to insure contact with the bottom record as it is moved off of the shelf 34. In other respects the adaptor 20*b* is substantially identical to that described in detail heretofore in connection with the embodiment of FIGS. 1 to 5**, inclusive.

While there have been illustrated and described various embodiments of the present invention, it will be apparent that various changes and modifications thereof will occur to those skilled in the art. It is intended in the appended claims to cover all such changes and modificiations as modifications within the true spirit and scope of the present invention.

What is claimed as new and desired to be secured by Letters Patent of the United States is:

1. In a phonograph, the combination of, a record ejecting spindle including a vertically extending body portion and having a movable record ejector member for ejecting the bottom record of a stack of small hole records positioned on said record ejecting spindle to travel into playing position on the turntable, a spindle adaptor adapted to be placed in an operative position on said record ejecting spindle, said adaptor having a shelf for supporting a stack of large hole records above the turntable and including a body portion having opposed wall portions which define a vertically extending recess therebetween, a member having a base portion solidly connected to said body portion and positioned in said recess, said member having an elongated, flexible vertically extending portion intermediate said base portion and a free head portion, said head portion having one edge which is adapted to be engaged by said record ejector member and an opposite edge which is positioned adjacent said adaptor shelf when said adaptor is in operative position on said spindle, whereby said free head portion is moved in an arcuate path within said recess by engagement of said record ejector member with said one edge and said opposite edge of said free head portion moves the bottom record of a large hole stack of records off said adaptor shelf during a record changing cycle.

2. The combination of claim 1, wherein said record ejector member is positioned in a non-ejecting rest position at the start of a record changing cycle, said head portion is supported solely by said flexible portion of said member and is normally positioned adjacent said record ejector member when in said rest position, and said head portion is returned to said normal position by virtue of the biasing force built up in said flexible portion during flexure thereof by said record ejector member.

3. The combination of claim 2, wherein the upper surface of said head portion is shaped to facilitate the return of said head portion to said normal position in response to said biasing force despite the weight of additional large hole records resting on said upper surface after the bottom record has been moved off said adaptor shelf.

4. The combination of claim 3, wherein said upper surface is beveled a sufficient amount that said additional records are not lifted by the arcuate movement of said head portion as said head portion is returned to said normal position.

5. The combination of claim 1, wherein said elongated vertically extending intermediate portion is positioned along a vertical line which is relatively close to said adaptor shelf, thereby to minimize downward movement of said outer edge of said head portion as said head portion is moved through said arcuate path by engagement with said record ejector member during the record changing cycle.

6. In a phonograph, the combination of, a record ejecting spindle including a vertically extending body portion and having a movable record ejector member for ejecting the bottom record of a stack of small hole records positioned on said record ejecting spindle to travel into playing position on the turntable, a spindle adaptor adapted to be placed in an operative position on said record ejecting spindle, said adaptor having a shelf for supporting a stack of large hole records above the turntable and including a body portion having opposed wall portions which define a vertically extending recess therebetween, and a plurality of independent flexible members each having a base portion solidly connected to said body and positioned in spaced relation within said recess, said flexible members each having an elongated vertically extending portion intermediate said base portion and a free end portion, said free end portions of said flexible members being positioned for the cooperative transfer of movement of said record ejector member to the inner edge of the bottom record of a stack of large hole records supported on said adaptor shelf, whereby saiid free end portions of said flexible members move in arcuate paths within said recess.

7. The combination of claim 6, in which said free end portions of said flexible members are spaced slightly apart when said adaptor is removed from said spindle.

8. The combination of claim 6, wherein said flexible members are normally slightly flexed by engagement of the innermost free end portion with said body portion of said record ejecting spindle, thereby to insure that said free end portions move in unison in response to movement of said record ejector member.

9. In a phonograph, the combination of, a record ejecting spindle including a vertically extending body portion and having a movable record ejector member for ejecting the bottom record of a stack of small hole records positioned on said record ejecting spindle, a spindle adaptor adapted to be placed over said record ejecting spindle in an operative position, said adaptor having a shelf and an upper record receiving section for maintaining a stack of large hole records seated on said shelf so that they can be released therefrom generally concentrically with said spindle, said adaptor also having a lower section one portion of which terminates at said adaptor shelf, a member for transferring movement of said record ejector member to the inner edge of the bottom record of a stack of large hole records seated on said adaptor shelf so that said bottom record is moved off said adaptor shelf, a shoulder on said adaptor which is immovable in a horizontal plane and is positioned diametrically opposite said adaptor shelf, said shoulder being inclined inwardly and downwardly and the distance from the edge of said upper record receiving section adjacent said shelf to the upper edge of said inclined shoulder being less than the inside diameter of a large hole record so that the stack of large hole records may be readily removed after they have been played by camming the same around said shoulder as the records are lifted off of said adaptor.

* * * * *